United States Patent
Vogiatzis et al.

(10) Patent No.: US 10,470,480 B2
(45) Date of Patent: *Nov. 12, 2019

(54) METHOD FOR MANUFACTURING A FEED PRODUCT

(71) Applicant: PURAC BIOCHEM BV, Gorinchem (NL)

(72) Inventors: Nikolaos Vogiatzis, Gorinchem (NL); Symone Kok, Gorinchem (NL); Barbara Lara Veldhuis-Stribos, Gorinchem (NL)

(73) Assignee: PURAC BIOCHEM B.V., Gorinchem (NL)

( * ) Notice: Subject to any disclaimer, the term of this patent is extended or adjusted under 35 U.S.C. 154(b) by 0 days.

This patent is subject to a terminal disclaimer.

(21) Appl. No.: 16/152,572

(22) Filed: Oct. 5, 2018

(65) Prior Publication Data

US 2019/0037886 A1    Feb. 7, 2019

Related U.S. Application Data

(62) Division of application No. 15/032,427, filed as application No. PCT/EP2014/072965 on Oct. 27, 2014, now Pat. No. 10,123,554.

(30) Foreign Application Priority Data

Oct. 30, 2013  (EP) .................................. 13190908

(51) Int. Cl.
*A23K 20/158* (2016.01)
*A23K 40/00* (2016.01)

(52) U.S. Cl.
CPC ............ *A23K 20/158* (2016.05); *A23K 40/00* (2016.05)

(58) Field of Classification Search
CPC ............................... A23K 20/158; A23K 40/00
See application file for complete search history.

(56) References Cited

U.S. PATENT DOCUMENTS

| | | | |
|---|---|---|---|
| 2008/0287538 A1 | 11/2008 | Scholz et al. | |
| 2010/0311832 A1 | 12/2010 | Cazemier | |

FOREIGN PATENT DOCUMENTS

| | | |
|---|---|---|
| CN | 101641320 A | 2/2010 |
| CN | 102123997 A | 7/2011 |
| EP | 2082739 A1 | 7/2009 |
| WO | 2009/092787 A1 | 7/2009 |
| WO | 2013/007558 A2 | 1/2013 |

OTHER PUBLICATIONS

Apr. 3, 2019 Office Action issued in Chinese Application No. 201480058763.
Jan. 15, 2015 International Search Report issued in International Patent Application No. PCT/EP2014/072965.
Jan. 15, 2015 Written Opinion issued in International Patent Application No. PCT/EP2014/072965.
Boutte, Troy and Skogerson, Larry. "Stearoyl-2-Lactylates and Oleoyl Lactylates". In: Robert J Whitehurst: "Emulsifiers in Food Technology", Aug. 3, 2004, Blackwell Publishing Ltd, Oxford, UK, XP055103895, pp. 206-225.
Joint FAO/WHO Codex Alimentarius Commission: "Recommended International Code of Practice for the Storage and Transport of Edible Fats and Oils in Bulk". In: "Fats, Oils, and Related Products", Jan. 1, 2001, Food and Agriculture Organization, FAO, Rome, Italy, XP055103942, vol. 8, pp. 71-81.
Aug. 8, 2017 Office Action Issued in U.S. Appl. No. 15/032,427.
Mar. 22, 2018 Office Action issued in U.S. Appl. No. 15/032,427.
Feb. 6, 2018 Office Action issued in European Application No. 14789830.8.

*Primary Examiner* — Gina C Justice
(74) *Attorney, Agent, or Firm* — Oliff PLC

(57) ABSTRACT

The present invention pertains to a method for manufacturing a feed product comprising the steps of: providing a lactylate product, wherein the lactylate product comprises at least 30 wt. % of C10-C16-fatty acid lactylates, in liquid form at a first location; transferring lactylate product in the liquid form to a transport unit; transporting the lactylate product in the transport unit to a second location, with the lactylate product being in solid form, in liquid form, or in an intermediate state during transport; if the lactylate product is solidified or partly solidified, converting the lactylate product to the liquid form in the transport unit; removing the lactylate product from the transport unit in liquid form at the second location; and, contacting the lactylate product in liquid form with a feed product.

21 Claims, No Drawings

METHOD FOR MANUFACTURING A FEED PRODUCT

This is a Divisional of application Ser. No. 15/032,427 filed Apr. 27, 2016. The entire disclosures of the prior application is hereby incorporated by reference in its entirety.

The present invention pertains to a method for manufacturing a feed product which comprises a fatty acid lactylate.

It is known in the art that hydroxyl-acid esters such as lactylates and related compounds may be attractive to include in feed products. For example, WO 2009/092787 describes the use of these compounds in the treatment or prevention of intestinal infections in animals, and to increase the animal growth rate.

A problem with these types of components, and in particular the C10-C16 fatty acid lactylates, is their difficult handling properties in the ambient temperature range. The C10-C16 lactylates have a melting range which is in the region of ambient temperature. This means that during transport and storage the consistency of the product may vary from solid to liquid with paste-like composition in between. It will be evident to the skilled person that a material with such properties cannot be transported and stored in a reliable manner. In addition, commercial lactylate based products are not pure compounds but blends of lactylates, fatty acids (of the same chain length) and lactic acid. This adds an extra challenge since the product presents a wide range of melting points and, due to varying conditions during storage and transport, this can lead to an inhomogeneous blend of the various components, which is difficult to process further.

This problem was elegantly solved by incorporating the lactylate product into a porous solid carrier material, as is described in WO2013/007558. By incorporating the lactylates in a porous carrier, a free-flowing powder is obtained which can easily be transported and stored while retaining good properties. A disadvantage of this method is its relative inflexibility in that for each feed product a specific type of carrier may be required, e.g., larger particles for larger animals and smaller particles for smaller animals, or a carrier of one type for one type of animal, and a carrier of another type for another type of animal. The particle size of the product must be similar to the particle size of the feed, to allow better processability (eg. pelletizing) and to result in a more homogeneous end product. Additionally, the presence of any non-digestible (inorganic) carrier means that the addition of lactylate to a feed product may be accompanied by the addition of a component which by itself does not contribute to the nutritional properties of the feed, e.g., when diatomaceous earth is used as the carrier.

Accordingly, there is need in the art for a method for manufacturing a feed product which allows for the direct incorporation of lactylate product into a feed without adding undesirable components, which is so flexible that it can be applied to different types of feed and in different concentrations as desired, and which addresses the transport and storage problems of C10-C16 lactylate products.

The present invention provides such a process.

The invention pertains to a method for manufacturing a feed product comprising the steps of
  providing a lactylate product, wherein the lactylate product comprises at least 30 wt. % of C10-C16-fatty acid lactylates, in liquid form at a first location,
  transferring lactylate product in the liquid form to a transport unit,
  transporting the lactylate product in the transport unit to a second location, with the lactylate product being in solid form, in liquid form, or in an intermediate state during transport,
  if the lactylate product is solidified or partly solidified, converting the lactylate product to the liquid form in the transport unit,
  removing the lactylate product from the transport unit in liquid form at the second location, and
  contacting the lactylate product in liquid form with a feed product.

In the method according to the invention the transport problems are solved by the provision of a transport unit which permits the provision of the lactylate product to the unit in liquid form, and the removal of the lactylate product from the unit in liquid form, with any intermediate phase transitions from solid to inhomogeneous combination of liquid and solid to liquid being possible without interfering with storage or transport. At the same time, the provision of the lactylate to the end user in the form of a liquid allows the end user to combine it with the feed product as desired.

The process according to the invention will be discussed in more detail below.

The lactylate product used in the process according to the invention comprises at least 30 wt. % of C10-C16-fatty acid lactylates. The lactylates are of the formula R—COO—[—CH(CH3)-COO]n-H, wherein n stands for an integer with a value of 1-10, and R stands for a C10-C16 alkyl or alkenyl chain which may be branched or unbranched or the Na, K, Ca, Mg, Fe(II), Zn, $NH_4$ or CU(II) salts thereof.

Suitable substituents include groups with 10 carbon atoms (capric acid), 12 carbon atoms (lauryl), 14 carbon atoms (myristyl), and 16 carbon atoms (cetyl, palmityl). Mixtures of two or more compounds may also be used. The value for n is preferably in the range of 1-5. More in particular n has a value of 1, 2, or 3.

The use of lauroyl lactylate and myristolyl lactylate or the Na, K, Ca, Mg, Fe(II), Zn, $NH_4$ or CU(II) salts thereof is particularly preferred. In one embodiment, a lactylate mixture is used which, of the total amount of lactylates, comprises 5-95 wt. % of lauroyl lactylate and 95-5 wt. % of myristoyl lactylate. For instance, a mixture is used comprising 25-75 wt. %, preferably 40-60 wt. % of lauroyl lactylate, and 75-25 wt. %, preferably 40-60 wt. % of myristoyl lactylate. The mixtures may also comprise the Na, K, Ca, Mg Fe(II), Zn, $NH_4$ or CU(II) salts of said lactylates.

The preferred salts of the lactylates are the Na, K, Ca or Mg salts.

The lactylate product generally comprises C10-C16 fatty acids, usually in an amount of at least 10 wt. %, more specifically in an amount of 20 to 40 wt. %, and preferably 30 wt. %.

The lactylate product may comprise further components, e.g., lactic acid (and 2, 3, 4 oligomers e.g. lactoyl lactic acid), resulting from the manufacture of the lactylate product. For instance, lactic acid may be present in an amount of at least 1 wt. %, more specifically in an amount of 5 to 20 wt. %, and preferably 10 wt. %.

The process according to the invention is of particular interest for lactylate products which show a phase transition in a storage and transport temperature range of, for instance, 0-80° C.

In one embodiment, the lactylate product has a melting point (which in the present specification is a "real" melting point, or the start of a melting range when the temperature of a solid product is increased) which is at least 0° C., in particular at least 10° C. and more particularly at least 18° C.

In one embodiment, the lactylate product has a solidification point (which in the present specification is a "real" melting point, or the start of a solidification range when the temperature of a liquid product is decreased), which is at most 60° C., in particular at most 50° C.

The lactylate product is provided in liquid form. This can be the direct result of the manufacture of the product, or be after storage in any form.

The lactylate product in liquid form is generally at a temperature of at least 60° C., more particularly at least 80° C. At these temperatures transfer of the product can be effected without any problem. The upper limit is selected such that the lactylate product does not suffer from thermal degradation. In general, the temperature is selected to be as low as possible. It is generally within the ability of the skilled person to select a temperature at which the lactylate product is sufficiently fluid for transport to the transport unit, and at the same time low enough to ensure that heat degradation of the product is minimized.

The lactylate product is transferred to the transport unit in liquid form. The transferring step can be carried out by methods known in the art.

It is preferred for the transferring step, and in fact, for the process according to the invention at least up to the step of contacting the lactylate product in liquid form with a feed product, to be carried out under such conditions that the contact between lactylate product and air is minimized, because this may detrimentally affect the properties of the lactylate product. Therefore, it is preferred for the process according to the invention to be carried out under inert gas. Inert gas within the meaning of the specification is gas which does not substantially affect the properties of the lactylate product. Examples of inert gas are gases comprising one or more of nitrogen, and the noble gases. The inert gas is preferably free from oxygen and water.

The transport unit in the process according to the invention is a container containing the lactylate product. The transport unit is generally equipped with heating means to ensure that the lactylate product is in the liquid form when it is removed from the unit. Heating can be performed by steam or electrical tracing. Usually these means are combined with a proper insulation. It is preferred for the transport unit to also be equipped with stirring means to ensure that the product is homogeneous when it is removed from the transport unit. It is also preferred for the transport unit to be provided with heat insulation, to reduce heat loss. As suitable means for effecting heat insulation may be mentioned intermediate layers comprising a vacuum, a not particularly heat conductive gas or solid insulating materials, such as for example foamed polystyrene, glass or mineral wool or a combination of layers of these materials. Suitable insulation material will be evident to the skilled person.

As will also be evident to the skilled person, the transport unit should be tightly sealed during storage and transport, to prevent undesired contact of the lactylate product with the atmosphere.

The size of the transport unit is generally not critical to the process according to the invention; exemplary transport units may have volumes of up to 50 $m^3$, up to 100 $m^3$ or even up to 150 $m^3$ for instance. Generally, however, containers having volumes in the $dm^3$ and the $m^3$ range are used; transport units having volumes of from 0.01 to 10 $m^3$, from 0.01 to 1 $m^3$ or from 0.1 to 0.5 $m^3$ might be mentioned in this regard. The geometric form of the container is also generally irrelevant for the method according to the invention. In order to minimize heat losses, it may be preferred for the containers to have a low ratio of surface to volume. Preferred examples are essentially spherical containers (spherical tanks), and essentially cylindrical containers (e.g. bottles, barrels, cylindrical tanks, ISO containers, ISO tanks, and tankers).

The wall of the transport unit must be chemically inert relative to the lactylate product and impermeable relative to the gasses and vapors, in particular oxygen and water vapor. Suitable materials include, for example, steel, stainless steel, aluminum or internally varnished metal barrels. In the case of an internal varnishing or coating, care must be taken that these do not swell or become dissolved in the product. It is likewise important that oxygen and/or water are neither absorbed nor adsorbed. For containers having a volume of the $dm^3$ scale, walls of glass or polymer are also possible.

During the storage and transport of the lactylate product in a heat insulated container, the product can be located (i) directly without further containers or (ii) packed in further containers. As suitable examples of (i) can be mentioned heat-insulated containers (spherical tanks, cylindrical tanks or tankers) or heat-insulated barrels. As suitable examples of (ii) there may be mentioned heat-insulated containers (ISO containers) which contain the product in the form of further containers (barrels or bottles).

In a preferred embodiment of the method according to the invention, 220 liter barrels are stored or transported in a heatable container. Smaller unheated containers, e.g. 220 liter barrels, can be stored and transported in heatable containers. A preferred storage unit is a 27 to 40 $m^3$ (nominal volume) steam-heated ISO-tank (tank container) with nitrogen inert gas headspace.

The lactylate product is in liquid form when it is transferred into the transport unit at the first location, when it is removed from the transport unit at a second location, and when it is contacted with the feed product. During transport from the first location to the second location, the lactylate product may be in liquid form, in solid form, or in an intermediate state, for example, in the form of a paste or a suspension.

If the transport step takes a relatively short period of time—such as 7 days or less, calculated from the moment the lactylate product has been transferred to the transport unit to the moment that the removal of the lactylate product from the transport unit starts—it may be preferred for the lactylate product to be kept in the liquid state. This applies more-so when the volume of the transport vessel is relatively large—at least 1 $m^3$ for instance—because relatively large reactor volumes will cool down less quickly than smaller reactor volumes. In addition, if a relatively large volume of the lactylate product solidifies, more time and energy is needed for re-melting.

In other situations, especially where the transport step is longer than 7 days, it may be preferred to let the lactylate product cool down, with associated formation of solid product, for the total lactylate product, or for part of the lactylate product, to form an intermediate stage. The lactylate product will then be converted to the liquid phase before it is removed from the unit. Conversion of the product to the liquid phase can be carried out by heating, preferably with stirring.

Depending on the vessel, heating can take place using the heating means with which the vessel is equipped. It may also be possible to effect heating by disposing the vessel in an oven with suitable temperature. It is preferred for the temperature of the lactylate product to become not higher than 20° C. above the melting point (or the end of the melting range) of the lactylate product, as this may detrimentally affect the properties of the product, without bringing additional benefit. It is also preferred that the wall(s) of the vessel and/or the heating elements do not reach a temperature above 150° C., in order to prevent heat degradation. Again, it is preferred for this step to be carried out under an inert atmosphere, as described above.

Removal of the lactylate product from the transport unit can be carried out by methods known in the art. As is indicated above, this step is preferably carried out under inert atmosphere. The temperature of the liquid lactylate product as it is removed from the transport unit is generally in the range of from 80 to 100° C.

After removal from the transport unit, the lactylate product is contacted in liquid form with a feed product. This can be done directly, but it is possible to combine the lactylate product with other liquid components before it is combined with the feed product. Examples of suitable liquid products are oils of vegetable or animal origin, fats of animal or vegetable origin, and further liquid organic compounds suitable for use in animal feed, such as polyethylene glycol. The product at issue should be liquid at application temperature.

Contacting the lactylate product, whether or not mixed with other components, with a feed product can be carried out by methods known in the art. Exemplary methods include spraying or mixing.

The feed product with which the lactylate product is combined is a solid feed product.

The feed product with which the lactylate product is combined may be a final feed product, which will be provided to animals without addition of further components. The feed product may also be an intermediate feed product, which will be used as a component in the final feed product as it will be provided to the animal.

In the final animal feed, the lactylate product will generally be present in an amount of 0.0001-5 wt. %. In a preferred embodiment, the amount may be in the range of 0.001 to 2 wt. %, more specifically 0.001 to 1 wt. % or 0.001 to 0.5 wt. %. It is within the scope of the skilled person to determine the amount necessary. The feed product will be an otherwise conventional feed product comprising, for example, one or more of wheat, starch, meat and bone meal, maize, sunflower meal, corn, cereals, barley, soybean meal, tapioca, citrus pulp, legumes, beet pulp, etc.

The present invention is further illustrated by the following Example, without being limited thereto or thereby.

EXAMPLE 1

To illustrate the present invention 250 g of a lauroyl and myristoyl (C12/C14) lactylate product was brought into a storage vessel in liquid form. The composition of the lactylate product is given in Table 1.

TABLE 1

Composition of lactylate product under inert atmosphere storage at 120° C.

| | Concentration (% wt.) | | |
|---|---|---|---|
| Component | Day 1 | Day 5 | Day 10 |
| Lactic Acid | 11.1 | 11.5 | 11.5 |
| Lactoyl Lactic Acid | 2.2 | 2.8 | 2.8 |

TABLE 1-continued

Composition of lactylate product under inert atmosphere storage at 120° C.

| | Concentration (% wt.) | | |
|---|---|---|---|
| Component | Day 1 | Day 5 | Day 10 |
| Total Fatty Acids | 30.4 | 30.2 | 30.1 |
| Total Lactylates | 56.3 | 55.5 | 55.6 |

The liquid lactylate product had a temperature of 120° C. when it was brought into the storage vessel. The storage vessel was a container which was stored in an oven at a constant temperature of 120° C. The vessel was filled with an inert atmosphere of Nitrogen before liquid lactylate was incorporated therein.

The storage vessel containing the lactylate product was stored for a period of 10 days. In the vessel, the lactylate product was in liquid (melt) state during storage. After 5 and 10 days a sample was taken and analyzed by means of Gas Chromatography. The results of the analysis can also be seen in Table 1.

At the end of the 10 day period, the properties of the lactylate product are good, the product being a homogeneous liquid, with very little or no degradation having taken place. A visual assessment of the color between samples of day 1 and 10 have revealed a very slight change of color.

COMPARATIVE EXAMPLE 1

The same experiment has taken place with the only difference being that the lactylate product was stored without using an inert atmosphere. The results are shown in Table 2.

TABLE 2

| | Concentration (% wt.) | | |
|---|---|---|---|
| Component | Day 1 | Day 5 | Day 10 |
| Lactic Acid | 11.1 | 12.9 | 14.2 |
| Lactoyl Lactic Acid | 2.2 | 2.9 | 2.6 |
| Total Fatty Acids | 30.4 | 35.2 | 35.3 |
| Total Lactylates | 56.3 | 49.0 | 47.9 |

Looking at the results, it becomes clear that the lactylates have degraded. The mechanism of degradation is probably hydrolysis of the lactylates into fatty acids and lactic acid.

By visual inspection of the product, it also becomes clear that there was a clear coloration of the product. The sample of day 10 has a dark brown color in comparison to the off-white color of the sample of day 1.

It will be apparent to those skilled in the art, upon consideration of the specification, that various modifications can be made in the disclosed embodiments without departing from the scope of the invention. It is therefore intended that the embodiments and examples be considered illustrative only, with the true scope of the invention being indicated by the following claims.

The invention claimed is:

1. Method for storage and transport of a lactylate product comprising the steps of:
providing a lactylate product, wherein the lactylate product comprises at least 30 wt. % of C10-C16-fatty acid lactylates or the Na, K, Ca, Mg, Fe(II), Zn, NH4 or Cu(II) salts thereof, in liquid form at a first location;

transferring lactylate product in the liquid form to a transport unit;

transporting the lactylate product in the transport unit to a second location, with the lactylate product being in solid form, in liquid form, or in an intermediate state during transport;

if the lactylate product is solidified or partly solidified, converting the lactylate product to the liquid form in the transport unit; and removing the lactylate product from the transport unit in liquid form at the second location, wherein the lactylate product in liquid form is at a temperature of at least 60° C.

2. Method according claim 1, wherein the lactylate product is in the liquid form during transport, with the transport unit being equipped with heating means to keep the lactylate product above its melting point.

3. Method according to claim 1, wherein the lactylate product is in the solid form during transport, with the transport unit optionally being equipped with heating means to convert the lactylate product to the liquid form.

4. Method according to claim 1, wherein the transport unit has a volume of from 0.01 to 10 m$^3$.

5. Method according to claim 1, wherein the lactylate product in the transport unit is under an inert atmosphere.

6. Method according to claim 5, wherein the steps of transferring lactylate product in the liquid form to a transport unit and/or removing the lactylate product from the transport unit in liquid form are carried out under an inert atmosphere.

7. Method according to claim 1, wherein the lactylate product is solid at room temperature.

8. Method according to claim 1, wherein the lactylate product comprises:

at least 30 wt. % of C10-C16-fatty acid lactylates or the Na, K, Ca, Mg, Fe(II), Zn, NH4 or Cu(II) salts thereof; and, at least 10 wt. % of C10-C16 fatty acids.

9. Method according to claim 8, wherein the lactylate product comprises from 20 to 40 wt. % of C10-C16 fatty acids.

10. Method according to claim 1, wherein the lactylate product is mixed with an organic liquid.

11. Method according to claim 10, wherein the lactylate product is mixed with an organic liquid oil after removal from a transport unit.

12. Method according to claim 1, wherein the lactylate product comprises at least one of lauroyl lactylate and myristolyl lactylate or the Na, K, Ca, Mg, Fe(II), Zn, NH4 or Cu(II) salts thereof.

13. Method according to claim 1, wherein the lactylate product comprises a mixture of lauroyl lactylate and myristolyl lactylate in which the total amount of lactylates is 5-95 wt. % of lauroyl lactylate or a Na, K, Ca, Mg, Fe(II), Zn, NH4 or Cu(II) salt thereof, and 95-5 wt. % of myristoyl lactylate or a Na, K, Ca, Mg, Fe(II), Zn, NH4 or Cu(II) salt thereof.

14. Method according to claim 13, wherein the total amount of lactylates is 25-75 wt. % of lauroyl lactylate or a Na, K, Ca, Mg, Fe(II), Zn, NH4 or Cu(II) salt thereof, and 75-25 wt. % of myristoyl lactylate or a Na, K, Ca, Mg, Fe(II), Zn, NH4 or Cu(II) salt thereof.

15. Method according to claim 14, wherein the total amount of lactylates is 40-60 wt. % of lauroyl lactylate or a Na, K, Ca, Mg, Fe(II), Zn, NH4 or Cu(II) salt thereof, and 60-40 wt. % of myristoyl lactylate or a Na, K, Ca, Mg, Fe(II), Zn, NH4 or Cu(II) salt thereof.

16. Method according to claim 1, wherein the temperature is at least 80° C.

17. Method according to claim 1, wherein the method further comprises the step of contacting the lactylate product in liquid form with a feed product.

18. Method according to claim 17, wherein the feed product is a feed constituent, and wherein the feed constituent provided with lactylate product is combined with further feed constituents, to provide a feed.

19. Method according to claim 17, wherein the feed product is a final feed.

20. Method according to claim 17, wherein the lactylate product is mixed with an organic liquid before it is contacted with the feed product.

21. Method according to claim 17, wherein the lactylate product is mixed with an organic liquid oil after removal from a transport unit and before it is contacted with the feed product.

* * * * *